United States Patent [19]

Anderson

[11] Patent Number: 4,527,733
[45] Date of Patent: Jul. 9, 1985

[54] CHECK VALVE

[75] Inventor: Arthur H. Anderson, Needham, Mass.

[73] Assignee: Bimax Controls, Inc., Sherborn, Mass.

[21] Appl. No.: 511,884

[22] Filed: Jul. 8, 1983

[51] Int. Cl.³ .................... F24F 11/00; G05D 23/10
[52] U.S. Cl. ................... 236/41; 236/48 R; 236/93 R; 237/73
[58] Field of Search ............. 236/93 R, 48 R, 101 E, 236/40, 41, 43; 137/533.13; 237/73

[56] References Cited

U.S. PATENT DOCUMENTS

| | | | |
|---|---|---|---|
| 2,203,759 | 6/1940 | Ware | 137/533.13 X |
| 2,346,590 | 4/1944 | La Rocque et al. | 236/41 X |
| 3,450,342 | 6/1969 | Arledge, Jr. | 236/93 R X |
| 3,930,613 | 1/1976 | Place | 236/48 R |
| 4,027,848 | 6/1977 | Mundil | 236/101 E X |
| 4,133,478 | 1/1979 | Place | 236/48 R |
| 4,140,275 | 2/1979 | Inada | 236/101 E X |
| 4,142,677 | 3/1979 | Ludwig | 236/48 R X |
| 4,156,518 | 5/1979 | Ludwig | 236/101 E X |
| 4,262,844 | 4/1981 | Sekiya | 236/48 R |

Primary Examiner—William E. Tapolcai
Attorney, Agent, or Firm—John E. Toupal; Harold G. Jarcho

[57] ABSTRACT

A thermostatic valve including a housing that defines a housing inlet and a housing outlet and a valve body having an end wall and a side wall that define a valve chamber within the housing. The end wall defines an annular valve seat and a valve inlet opening encircled thereby while the side wall defines a plurality of valve outlet openings communicating with the valve chamber. Retained within the valve chamber is a resilient, annular seal encircling the valve inlet opening and a bi-metallic disc substantially parallel to the valve seat and normally spaced therefrom by a distance greater than the thickness of the annular seal. In response to a predetermined ambient temperature the bi-metallic disc deflects concavely into the valve chamber and into fluid sealing engagement wih one end of the annular seal forcing an opposite end thereof into fluid sealing engagement with the valve seat.

7 Claims, 3 Drawing Figures

CHECK VALVE

BACKGROUND OF THE INVENTION

This invention relates in general to heating systems and in particular to two pipe steam heating systems.

Although extensively used, thermostatially steam trapped radiator systems exhibit a number of perplexing disadvantages. For example, thermostatic steam traps are susceptible to failure and such failures are difficult to diagnose. Generally, faulty traps are diagnosed with relatively expensive infrared equipment that must make difficult distinctions between operating temperatures of about 190° and 210° F. Even after a given trap has been accurately diagnosed as faulty the repair thereof is a relatively expensive process. Another disadvantage is relatively poor energy efficiency resulting from the steam traps discharge of condensate at either steam temperature or slightly below. That factor also is responsible for the annoying hammering, clapping and vibration sounds commonly associated with such systems. Still other problems associated with thermostatic steam trap radiator systems stem from the restrictions to high temperature condensate in many municipal sewage systems.

The object of this invention, therefore, is to provide an improved steam heating system that alleviates many of the problems encountered by users thermostatic steam traps.

SUMMARY OF THE INVENTION

The invention is a thermostatic valve including a housing that defines a housing inlet and a housing outlet and a valve body having an end wall and a side wall that define a valve chamber within the housing. The end wall defines an annular valve seat and a valve inlet opening encircled thereby while the side wall defines a plurality of valve outlet openings communicating with the valve chamber. Retained within the valve chamber is a resilient, annular seal encircling the valve inlet opening and a bi-metalic disc substantially parallel to the valve seat and normally spaced therefrom by a distance greater than the thickness of the annular seal. In response to a predetermined ambient temperature the bi-metalic disc deflects concavely into the valve chamber and into fluid sealing engagement with one end of the annular seal forcing an opposite end thereof into fluid sealing engagement with the valve seat.

In a preferred embodiment, the invention includes a steam radiator having a radiator inlet and a radiator outlet communicating with the housing inlet, and a thermostatically controlled steam trap connected for communication with the housing outlet. The thermostatic valve supersedes the thermostatic steam trap thereby eliminating problems associated with its use.

According to one feature of the invention, the valve's side wall is a cylindrical wall normal to its end wall and defining circumferentially spaced apart, radially directed outlet passages and the seal is a resilient O-ring having a thickness defined by its opposite ends and an outer diameter that is less than the inner diameter of the cylindrical side wall. This arrangement provides a thermostatic valve that is relatively inexpensive and extremely compact. Providing an annular space between the outlet passages of the cylindrical wall and the O-ring enhances throughput of the valve by allowing fluid flow both over and under the O-ring with the disc in an inactivated position.

According to another feature of the invention, the housing comprises a union, and the valve body comprises an annular skirt extending outwardly from the cylindrical side wall and retained by the union. This featured valve is easily installed into the pipe union that is typically provided between a conventional thermostatic steam trap and the outlet of a steam radiator.

According to still another feature of the invention, the bi-metallic disc is adapted to deflect inwardly and close the valve in response to an ambient temperature of between 120° and 140° F. Operation of the valve in this relatively low temperature range ensures that operation of the thermostatically controlled steam trap will be superseded and results in relatively low temperature condensate discharge that greatly improves the thermal efficiency of the system.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
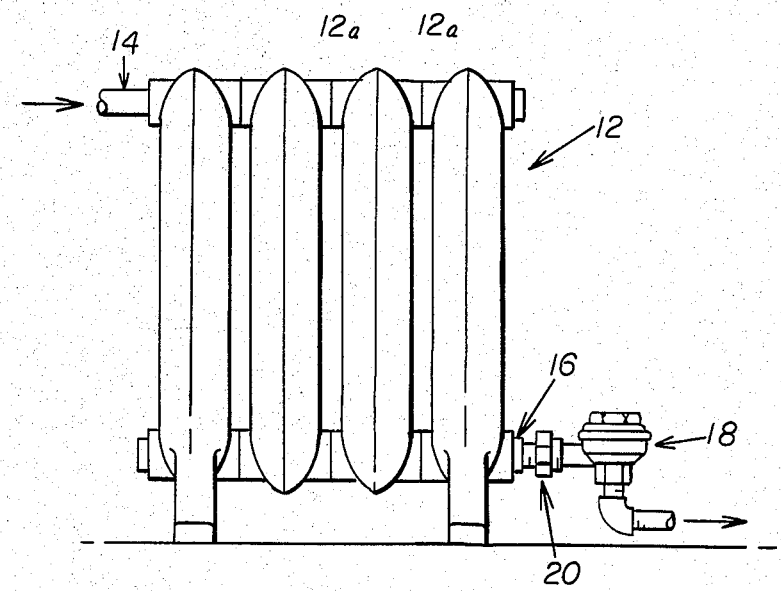
FIG. 1 is a view in front elevation of a steam heating radiator system according to the invention.

FIG. 1 shows a conventional steam radiator 12 for a two-pipe vapor system. The radiator has a steam inlet 14 and a return outlet 16. Steam from a boiler (not shown) is carried by mains, branches and risers (not shown) to a number of radiators 12 distributed throughout the structure being heated. Typically each room of the structure has at least one associated radiator 12. When a central thermostat or thermostats (not shown) activate a release of steam from the boiler, the steam flows into the inlet 14 of each radiator, through each section 12a of the radiator, and through the outlet 16 to a steam trap 18.

Figure 3:
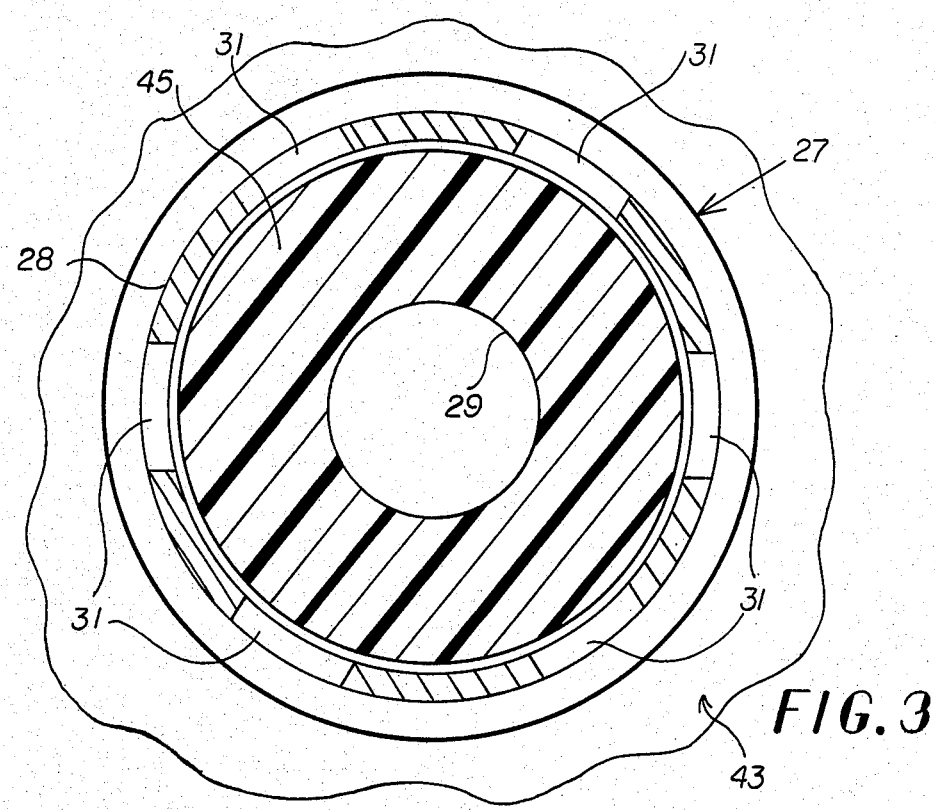
FIG. 3 is a schematic cross sectional view of the check valve shown in FIG. 2 and taken along lines 3—3.

In conventional systems the thermostatically controlled trap 18 would close the outlet 16 to retain steam being supplied by the boiler and resulting in the radiation of heat from the radiator 12. Shortly after a central thermostat has deactivated the boiler, the trap 18 would open the outlet 16 allowing the residual fluid content of the radiator 12 to empty into a return main that carries condensed water back to the boiler. However, in the present invention, that operation of the trap 18 is superseded by a thermostatically controlled valve shown in FIGS. 2 and 3.

A union housing 20 between the radiator 12 and the trap 18 includes an outlet pipe 21 from the radiator 12, an externally threaded inlet pipe 22 to the trap 18 and an internally threaded annular coupling 23. Defined by the pipes 21 and 22, respectively, are an inlet and an outlet of the union housing 20. As shown, the housing 20 retains a temperature controlled valve 25 that controls fluid flow between the inlet 21 and the outlet 22. The valve 25 includes a valve body 26 formed by an end wall 27 and a cylindrical side wall 28 projecting normally therefrom. Centrally defined in the end wall 27 is a valve inlet opening 29 while circumferentially spaced apart, radially directed valve outlet passages 31 are defined by the cylindrical side wall 28. The outer end of the cylindrical side wall 28 defines an annular shoulder portion 30 and axially projecting rim portion 32. An annular retainer ring 33 is staked under the shoulder portion 30 and forms therewith and the rim portion 32 an annular recess 34. Loosely retained in the annular recess 34 is the periphery of a bi-metalic disc 35. The disc 35 and the valve body 26 form a valve chamber 36. Extending outwardly from the central portion of the end wall 27 is a hollow neck portion 41 that accommodates a central opening 42 in a disc skirt 43. The disc is secured, for example by solder, to the valve body 26. An outer portion 44 of the skirt 43 extends beyond the sidewall 28 and is engaged in a fluid type manner between the pipes 21 and 22.

Figure 2:
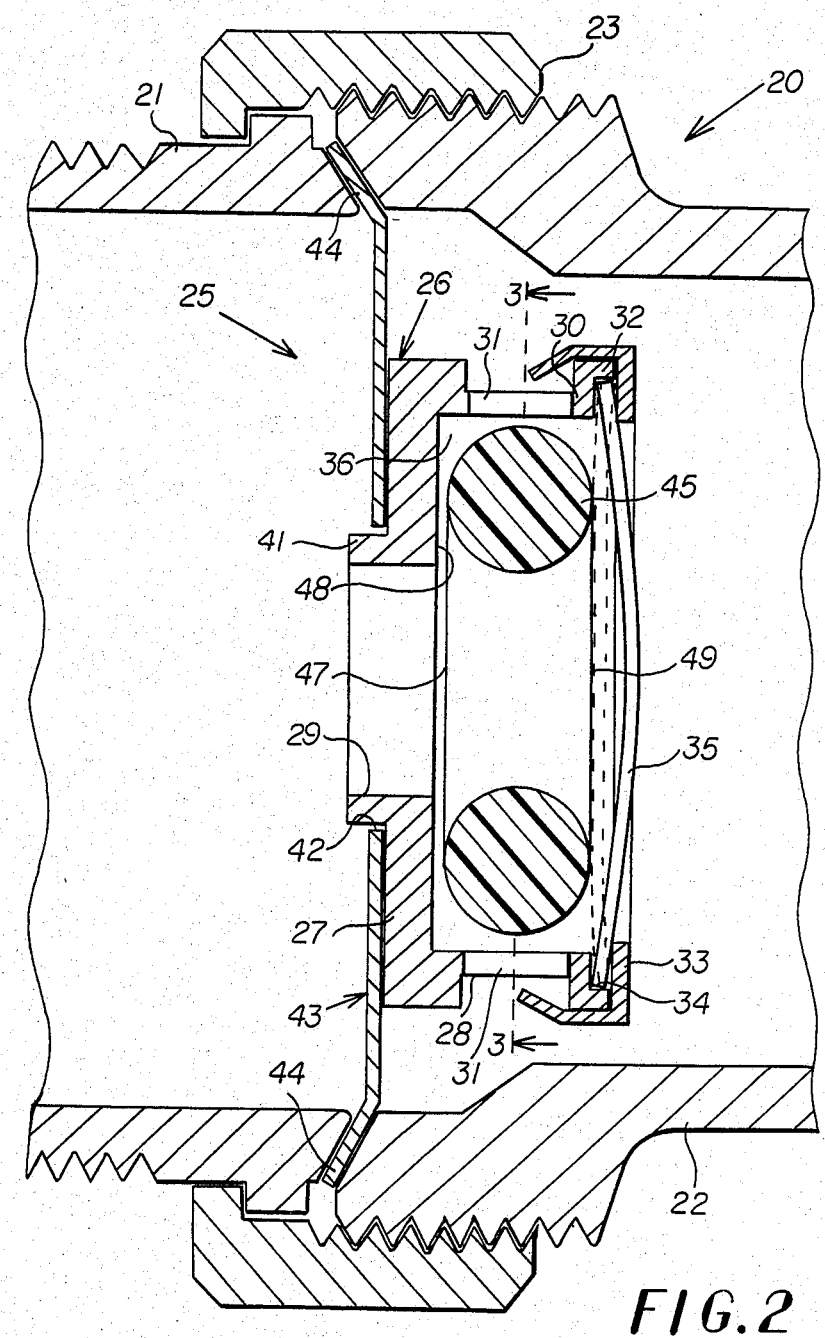
FIG. 2 is a schematic cross sectional taken through the union shown in FIG. 1.

Disposed within the valve chamber 36 is a resilient O-ring 45 formed, for example, of silicone. The O-ring 45 encircles the valve inlet opening 29 and has one end 47 directly adjacent an annular valve seat 48 formed by an inner surface portion of the end wall 27. An opposite end 49 of the O-ring 45 is disposed directly adjacent to the bi-metalic disc 35. As shown in FIG. 2, the thickness of the O-ring 45 defined by its ends 47 and 49 is less than the normal spacing between the valve seat 48 and the bi-metalic disc 35. Also the outer diameter of the O-ring 45 is slightly less than the inner diameter of the cylindrical side-wall 28. Thus, there exist between the valve inlet 29 and the valve outlets 31 flow passages between the O-ring 45 and, respectively, the valve seat 48, the bi-metalic disc 35 and the inner surface of the cylindrical side wall 28. It should be understood that these clearances are slightly exaggerated in FIGS. 2 and 3 for purposes of clarity.

In response to a predetermined ambient temperature, however, the bi-metalic disc 35 deflects concavely into the valve chamber 36 as shown by dotted lines in FIG. 2. The deflected disc 35 sealingly engages the end 49 of the O-ring 46 and forces the opposite end 47 thereof into sealing engagement with the valve seat 48. Thus, fluid flow is prevented between the valve inlet 29 and the valve outlets 31. In response to a subsequent reduction in ambient temperature, the bi-metalic disc 35 returns to its original position and again allows fluid flow between the valve inlet 29 and the valve outlets 31.

OPERATION

When steam is supplied by a boiler to the radiator 12, the bi-metalic disc 35 quickly reaches a predetermined activation temperature, preferably of about 130° F., and deflects inwardly to close the valve 25. Thus, steam is retained by the radiator 12 resulting in radiation of heat therefrom. Some time after the supply of steam to the radiator 12 has terminated, the ambient temperature of the disc 35 will fall to a given return temperature, preferably of about 100° F. The resultant return of the bi-metalic disc 35 to its undeflected position reopens the valve 25 allowing a discharge of the residual fluid within the radiator 12. That fluid, primarily condensate, passes through the steam trap 18 to a return main (not shown). Thus, steam never reaches the trap 18 and its function is completely superseded by the valve 25. For that reason, the present invention completely eliminates the heretofore described problems associated with conventional thermostatically controlled steam trap heating systems.

Obviously, many modifications and variations of the present invention are possible in light of the above teachings. It is to be understood, therefore, that the invention can be practiced otherwise than as specifically described.

What is claimed is:

1. A temperature responsive control system for a steam radiator having a radiator inlet and a radiator outlet and comprising:

housing means comprising a union and defining a housing inlet and a housing outlet, said housing inlet connected for fluid communication with the radiator outlet;

a valve body within said housing means and comprising an end wall, a side wall and a retaining ring portion that together define a valve chamber, said end wall defining a valve inlet opening providing communication between said housing inlet and said chamber and an annular valve seat within said chamber and encircling said valve inlet opening, and said side wall defining a valve outlet opening providing communication between said housing outlet and said chamber, said valve body further comprising an annular skirt portion extending outwardly from said side wall and retained by said union;

a resilient, annular seal means disposed within said valve chamber and encircling said valve inlet opening;

a bi-metalic disc within said valve chamber and having an outer peripheral portion retained by said retaining ring portion of said valve body, said disc being substantially parallel to said valve seat and normally spaced therefrom by a distance greater than the thickness of said annular seal means, and wherein said disc is adapted to respond to a predetermined ambient temperature within said valve chamber by deflecting concavely into said valve chamber and into fluid sealing engagement with one end of said annular seal means, an opposite end thereof being in fluid sealing engagement with said valve seat; and a thermostatically controlled steam trap connected to said housing outlet.

2. A system according to claim 1 wherein said side wall is a cylindrical wall normal to said end wall; and said outlet openings comprise circumferentially spaced apart, radially directed passages therein.

3. A system according to claim 2 wherein said seal means comprises a resilient O-ring.

4. A system according to claim 3 wherein said thickness of said O-ring is defined by said ends thereof.

5. A system according to claim 4 wherein the outer diameter of said O-ring is less than the inner diameter of said cylindrical side wall so as to permit fluid flow between said passages and said valve chamber.

6. A system according to claim 5 wherein said retaining ring portion loosely retains said peripheral portion of said disc.

7. A system according to claim 1 wherein said predetermined temperature is between 120° and 140° F. and said disc is further adapted to return to its original shape at an ambient temperature of between 100° and 110° F.

* * * * *